Oct. 7, 1930.　　　C. E. MERRICK　　　1,777,375
MACHINE FOR SKINNING MEAT
Filed Jan. 30, 1929　　3 Sheets-Sheet 1

Inventor
Charles E. Merrick
By
Charles B. Mann Jr,
Attorney

Oct. 7, 1930.   C. E. MERRICK   1,777,375
MACHINE FOR SKINNING MEAT
Filed Jan. 30, 1929   3 Sheets-Sheet 3

Inventor
Charles E. Merrick
By Charles B. Mann Jr.
Attorney

Patented Oct. 7, 1930

1,777,375

UNITED STATES PATENT OFFICE

CHARLES E. MERRICK, OF BALTIMORE, MARYLAND

MACHINE FOR SKINNING MEAT

Application filed January 30, 1929. Serial No. 336,033.

This invention relates to a machine for skinning meat and has particular reference to a machine which is especially designed for severing bacon meat from its rine or skin.

One object of the present invention is to provide a machine of improved construction whereby the rine or skin may be clamped and drawn past a cutter by power actuated means which latter will be automatically released when the clamp means has reached the limit of its stroke or the slab of bacon has been completely severed from its rine or skin.

Another object is to provide a treadle operated means for controlling the power means but also provide an automatic means which, regardless of the movement of the treadle-means, will stop the pulling movement of the clamp.

A further object of the invention is to provide an improved machine for skinning slabs of meat which may be operated by power to effect the skinning and leave the hands of the operator free to manipulate the meat and skin.

The present machine makes use of an improved cutter which is illustrated generally in this case but which forms the subject of a companion application executed and filed on even dates herewith.

The invention is illustrated in the accompanying drawings, wherein,—

Fig. 6 shows a sectional detail through the guideway in the table-top as viewed on the line 6—6 of Fig. 1.

Figure 1:
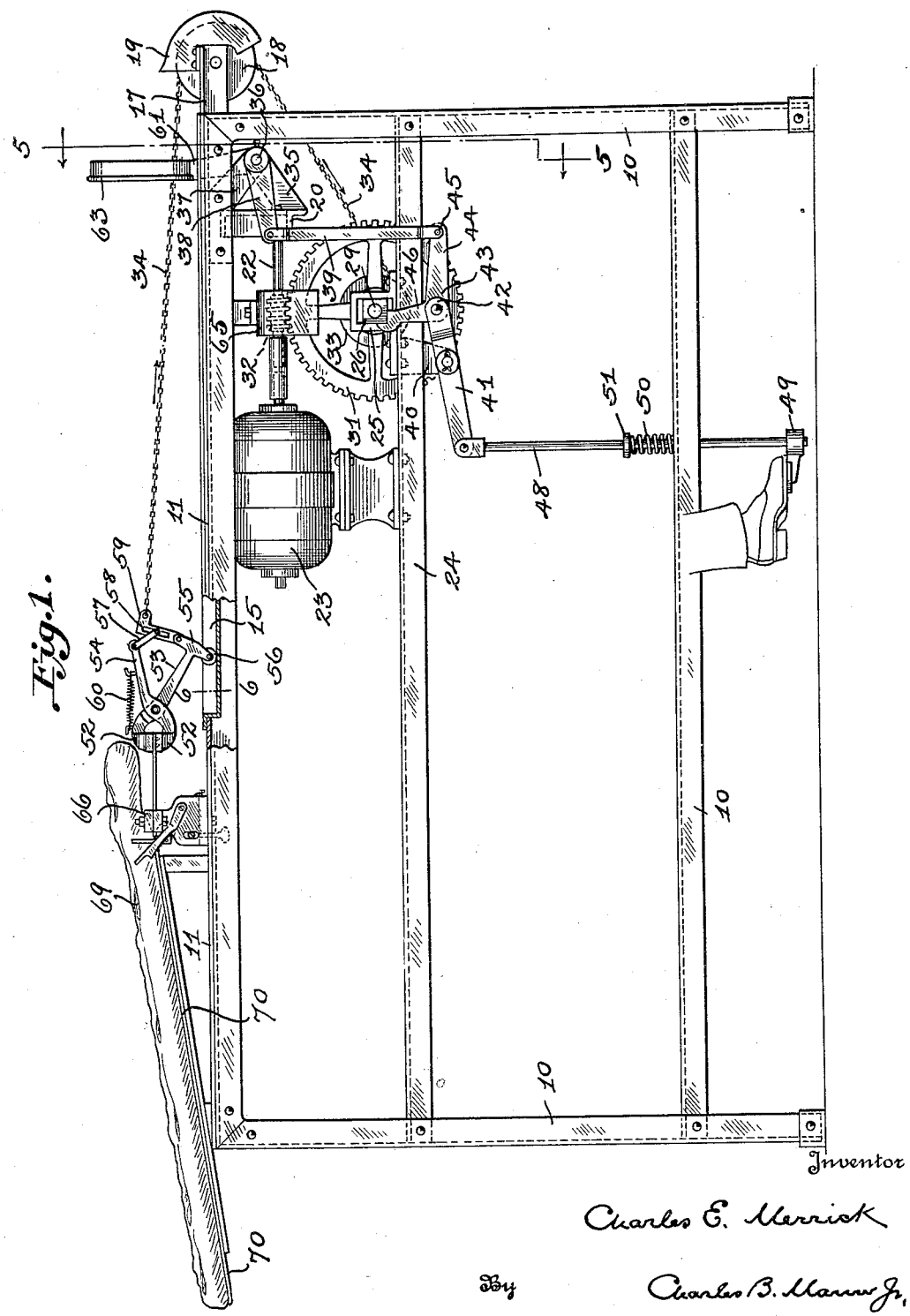
Fig. 1 shows the complete machine in side elevation.

Referring to the drawings, the numeral 10 designates a series of horizontal and vertical angle bars which together form one side of a frame, there being a similar structure to form another side frame. These two side frame structures are connected at opposite ends by cross bars and all together form a support for a table top 11.

The table-top 11 is of heavy sheet metal plate and is sufficiently rigid to serve the purpose for which it is intended.

The top has a longitudinal slot 12 extending centrally from one end thereof and in this slot I provide a channel iron 13 whose side flanges 14, seat upon the table top and sustain the depressed channel-part down in the slot to produce a longitudinal depressed guideway 15, as shown clearly in Figs. 2, 3, 4 and 6.

Suitable fastenings 16 rigidly hold the channel iron in place.

A pair of horizontally-extending arms 17 project from one end of the table near the end of the guideway and a grooved pulley 18, is supported by said arms so as to be in alinement with the guideway.

A suitable housing 19 is carried by the arms 17 and partially covers the grooved pulley, merely as a guard.

Figure 5:
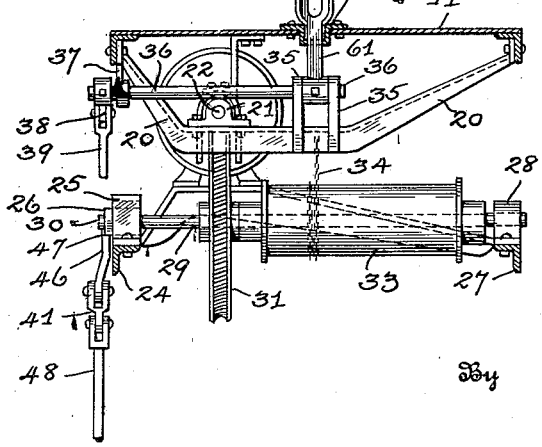
Fig. 5 shows a vertical section through the machine in front of the trip and power means,—the section being taken on the line 5—5 of Fig. 1.

A bracket-bar 20 extends crosswise beneath the table top and is supported by the uppermost bars of the two side frames, as clearly shown in Fig. 5, and this bracket sustains a bearing-block 21, in which one end of a motor-driven worm-shaft 22 is mounted.

This worm-shaft 22 extends lengthwise of and directly beneath the table-top and its operating end is connected to an electric motor 23, by which it is continuously driven.

The angle-bar 24 of one side frame supports a bearing bracket 25 in which a bearing block 26 is loosely mounted,—that is, mounted so as to have a slight vertical movement, while the angle bar 27, of the other side frame carries a bearing 28, as shown in Fig. 5.

The bearing-block 26 at the one side and the bearing 28 at the opposite side sustain a horizontal shaft 29, but sustain it so that the end 30 of that shaft at the one side may be given a slight vertical movement with the box 26,—the bearing 28 at the opposite end of said shaft permitting a slight rocking movement of the shaft-end therein. The purpose of providing for the slight vertical movement of shaft-end 30, will presently be explained.

A worm wheel 31 is carried by shaft 29 directly beneath the worm-shaft 22 and this wheel is in direct alinement with a worm 32 mounted on the said worm-shaft.

Figure 4:
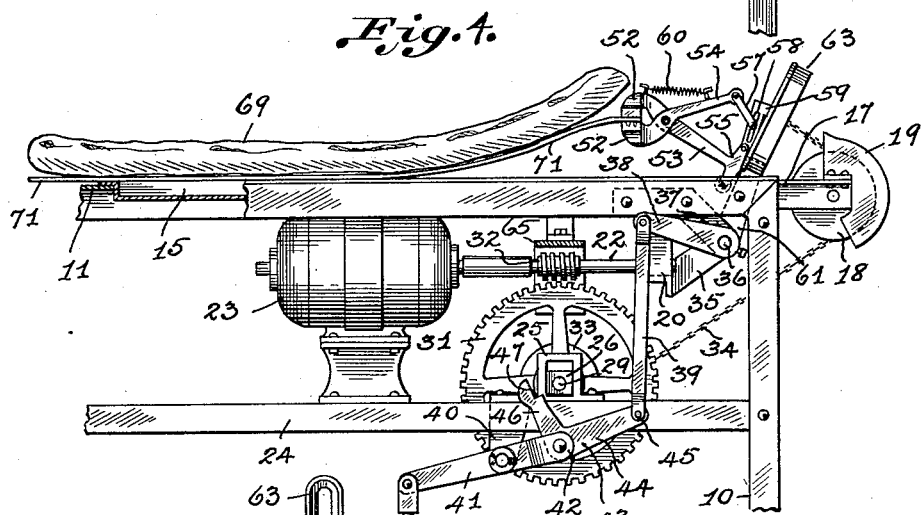
Fig. 4 illustrates the power end of the machine in side elevation with the skinned slab of bacon and the clamp at the extreme end of their movement and with the power-trip means in its actuated position.

By reference to Figs. 1 and 4, it will be noted that the worm wheel 31, is so arranged that it may be moved up into engagement or mesh with the worm 32 as in Fig. 1, or, it may be lowered and withdrawn from engagement or mesh with respect to the said worm as shown in Fig. 4. This movement of the worm wheel is effected through the slight vertical movement of the bearing-box 26 in the bearing 25, which gives a corresponding vertical movement to the one end 30 of horizontal shaft 29, which obviously will raise or lower the worm-wheel 31 as desired,—the movement however being effected by means which will presently be explained.

On the horizontal shaft 29, there is a drum 33 around which one end of a chain or equivalent flexible device 34 is wound and secured. This chain extends from the drum and passes over the grooved pulley 18, and is utilized to actuate a clamp device which will also presently be explained.

By now referring particularly to Fig. 5, it will be noted that the crosswise bracket-bar 20 carries two spaced bearing-arms 35, which extend upwardly and forwardly and that these arms sustain the inner end of a horizontal rock-shaft 36, while the outer end of this rock-shaft has bearing in a rigid arm 37 which depends from the inner side of the uppermost bar of the side frame, as shown in Figs. 4 and 5.

The extreme outer end of this horizontal rock-shaft carries a crank-arm 38, which latter has position in a vertical plane slightly outside of the side frame where it is free and may swing vertically.

A link-bar 39 has its upper bifurcated end pivotally attached to the free end of the crank-arm 38 and depends therefrom for a purpose that will presently be made clear.

By reference to Figs. 1 and 4, it will be seen that the horizontal angle-bar 24 of the side frame carries a depending bracket 40, and that a rock-bar 41 is pivotally connected to said bracket,—the pivot being at a point between the two ends of the rock-bar. The forward end of this rock-bar is bifurcated and pivotally connects with the angular bend of a bell-crank lever 43. The forward arm 44 of this bell-crank is pivotally connected at 45, to the lower end of the link-bar 39 while the other arm 46 of the said bell-crank extends upwardly beneath the bearing-block 26 and has a notched end 47 which is designed to be swung beneath the bearing-block 26 and be operated to lift that block slightly as the forward end 42 of the rock-arm is lifted.

In Fig. 1, the notched end 47 of the bell-crank arm 46 is shown engaged with the bearing-block 26 and the latter lifted to raise the outer end 30 of worm-wheel shaft 29 and the worm-wheel 31 so as to engage the latter with the worm 32, whereas in Fig. 4, the arm 46 is disengaged from the block and the latter is in the lowered position with the worm-wheel 31 lowered and disengaged from the worm 32.

Rock-bar 41 has its rear end pivotally connected to the upper end of a vertical treadle-bar 48, which latter passes through but is guided in the lowermost angle-bar of the side frame. The lower end of the treadle-bar carries a foot-treadle 49 while a spring 50 is coiled around said treadle-bar and is compressed between a collar 51 on the bar and the angle-bar of the frame so that when the foot-treadle 49 is released by the removal of the foot of the operator, the spring 50 will lift the bar 48 and the rear end of rock-bar 41, thereby depressing the forward end of said rock-bar and drawing the bell-crank lever 43 down to the position shown in Fig. 4 and lowering the bearing-box 26; shaft-end 30 and worm-wheel 31 to disengage the latter from the worm 32, and thus stop rotation of shaft 29 and the drum 33 thereon.

This release operation of bearing-box 26 depends upon the operator releasing the treadle 49 to stop rotation of the drum 33, and I have found that the operator cannot be entirely depended upon to operate the treadle, and of course, if he fails to do so, damage to the mechanism would result unless some automatic means be provided to effect the release. I have therefore provided an automatic release which will presently be described.

The drive mechanism, drum 33 and the chain 34 hereinbefore described are utilized to actuate a clamp and also to draw the meat and skin past a cutter, and these parts will now be described.

The clamp comprises two jaws 52 carried on two separate jaw-arms 53 and 54 which arms are crossed and pivotally connected like tongs.

The jaw-arms 53, has a T-head 55 at its end and one branch of this T-head extends down into the depressed guide-way 15 in the table-top, and this same end of the head carries a roller 56 which rolls in the guide-way.

The jaw-arm 54 of the tong-clamp has a pivoted link 57 at its end which link passes through a longitudinal slot 58 in a link-bar 59. The lower end of the link-bar 59 is pivotally connected to the upper branch of the T-head of jaw-arm 53.

One end of chain 34 is connected to the upper end of the link-bar,—the other end of said chain, as hereinbefore stated being connected to drum 33, so the chain will be wound on the drum and the link-bar pulled down at its upper end, thereby causing the link 57 to slide down in the slot 58 and draw the jaw-arm 54 down toward the head 55 and bring the two clamp-jaws 52 together.

A spring 60, serves to open the jaws when pull on the link-bar 59 is relieved.

It will be noted horizontal rock-shaft 36, carries a trip-lever 61 which latter is mounted on the inner end of the rock-shaft between the two bearing-arms 35, as best seen in Fig. 5.

Figure 3:
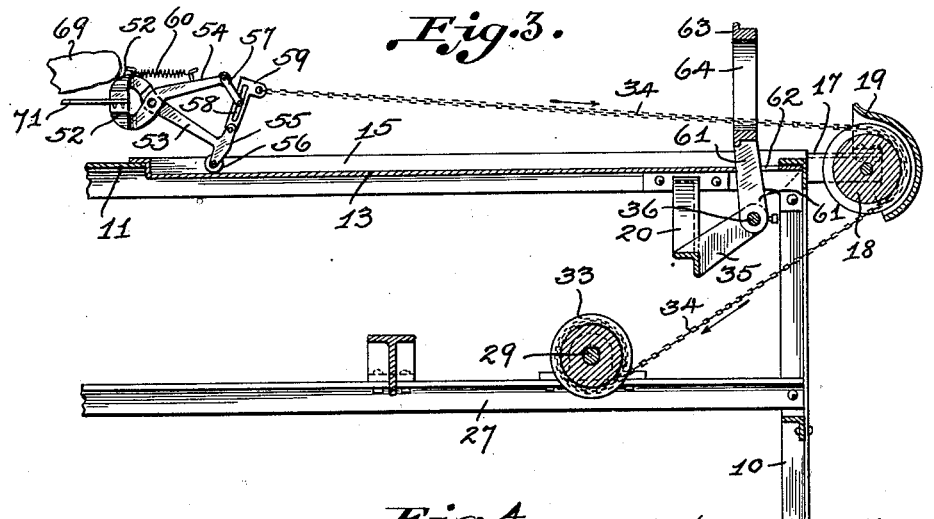
Fig. 3 shows a longitudinal vertical section through the machine,—the section being taken on the line 3—3 of Fig. 2.

This trip-lever extends upwardly from the rock-shaft and passes through a slot 62, at the forward end of the depressed guideway 15, as clearly shown in Fig. 3 and the upper end of this lever has an enlarged trip-head 63, which latter is provided with a vertical slot 64.

By referring to Fig. 3, it will be noted that chain 34, from drum 33 extends upwardly and around guide pulley 18, then passes through the slot 64 of the trip-head 63 and extends back over the table top and engages the link-bar 59.

It will also be noted, by reference to Fig. 1, that the trip-head 63 is located at the forward end of the guide channel 15 along which the roller 56 and the T-head 55, of the tong-clamp travel when the chain 34 is wound on the drum 33, and that the trip-head 63 lies in the path of the T-head 55 and will be struck by the latter, as shown, in Fig. 4, if rotation of the drum has not been stopped before the tong-clamp parts reach the trip head.

If therefore, the operator fails to release treadle 49 when the cutting operation (presently to be described) is completed, the tong-parts will be drawn along the guide channel 15 until they engage the trip-head 63, whereupon the head will be swung forward, as shown in Fig. 4, which movement will rock the shaft 36; lift the free end of crank-arm 38; lift link-bar 39 and rock bell-crank lever 43, thereby swinging arm 46 of that lever from beneath the bearing-box 26 and thus permit the box and the end 30 of shaft 29 to drop and withdraw the worm-gear 31 from engagement with the worm 32. This dropping of worm-gear 31 immediately stops rotation of the latter and of course, stops rotation of drum 33 and the winding of the chain 34 thereon. If therefore, the operator fails to release treadle 49 to throw the gear 31 out of mesh, the movement of the trip-lever 63, will automatically operate to release the gear from the worm and effect the desired result.

Figure 2:
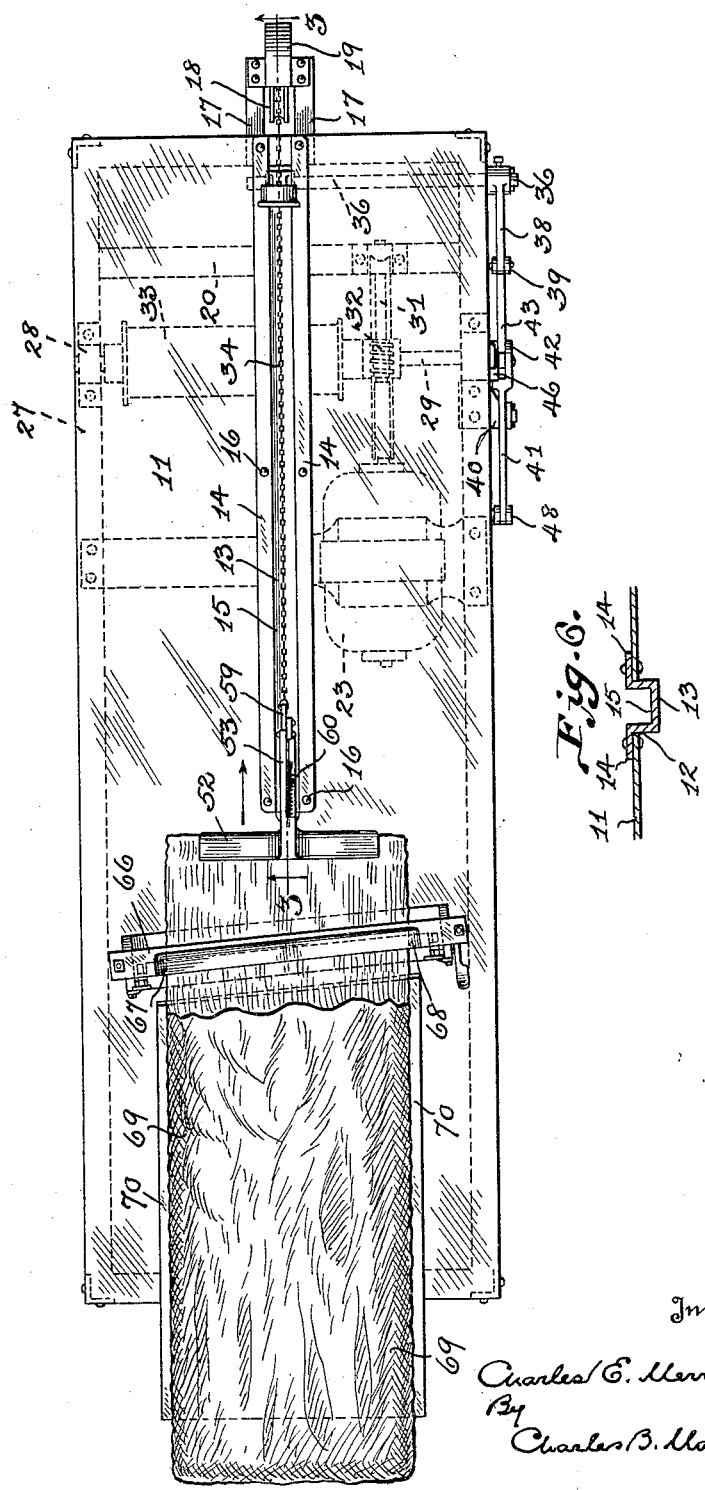
Fig. 2 illustrates the same in top view.

The particular cutting mechanism employed by me forms the subject of a companion application and is therefore not illustrated in detail in the present case, but a brief description thereof and some of the parts associated therewith will now be made, reference being had particularly to Figs. 1 and 2 of the drawings.

Beyond the inner end of the guide channel 15, and extending crosswise of the table-top 11, I mount a horizontal cutter-bar 66 which latter, it will be noted is arranged on a slight diagonal line across the table-top, instead of being at right angles to the guide-channel. This diagonal arrangement of the cutter-bar throws one end 67 of the cutting edge slightly toward the rear of the opposite end 68, so that when a slab of bacon 69, for example, is drawn past the cutter on a line parallel with the guide groove, one end of the cutting blade will begin cutting longitudinally through the slab of meat before the opposite end begins to cut and the result will be a shear cut, which in practice is more readily effected than a straight cross-wise cut.

To facilitate the movement of the slab of meat to the cutter mechanism, I provide an inclined meat-guide 70 upon which the slab of meat may rest while it is being made ready to be drawn over the cutter bar.

In practice, the slab of meat will be cut from the rine 71 slightly at one end, and by hand, for a distance sufficient to permit the clamp-jaws 52 of the tongs to be engaged with the severed end of the rine.

The slab is then laid upon the inclined guide 70 and the freed end of the rine 71 is then fed beneath the cutter bar 66, while the meat is passed over the top of the cutter. The projecting end of the rine is then engaged by the jaws 52 of the tong-clamp and everything is then in readiness to start the machine.

The operator then depresses the treadle 49 with the foot which pulls down rod 48; moves rock-bar 41 which lifts end 42 and raises bell-crank 43 and its arm 46, thereby lifting bearing-block 26 and end 30 of shaft 29.

This shaft 29 is mounted so that the end 30 thereof may be lifted by the upward movement of the block 26, to enable worm-gear 31 to be raised into engagement with worm 32 and thus begin rotation of said gear 31 and its shaft 29 with the drum 33 which is mounted on said shaft.

Roll 33 therefore begins to revolve and wind the chain 34 thereon. As the chain tightens, it draws on link-bar 59 which latter, because of its tendency to swing down, will pull on link 57 and draw down on jaw-arm 54 thereby clamping the jaws 52 close together over the end of the rine 71, and the pull by the chain 34 holds the T-head 55 and its roller 56 down in the guide channel 15 which will direct the tongs in a straight line as they move forward over the table, drawing the rine under the cutting blade 66, and directing the meat over the blade.

The chain 34 is thus wound on the roll 33 to pull the rine and meat past the cutter and sever the rine therefrom.

As the rine is completely severed, the operator may release the foot treadle 49, and throw the gears out of mesh to stop further winding of the chain on the drum, but if he fails to do so, the trip-head 63 will be engaged by the tong and an automatic trip of the arm 46 from beneath the bearing-block 26, will effect a throwing out or disengagement of the gears and thus automatically stop the drum and prevent damage to any of the parts.

The tongs are then disengaged from the cut-off rine; the rine and meat disposed of, and the operator then takes the tongs in his hand and pulls them back, unwinding the chain from the drum as he does so, and the parts are then in position to operate on another slab of meat.

In the present disclosure, I have illustrated and described a chain 34 to operate as the flexible strand to connect the tong-clamp with the drum, but it is obvious that either a cable or rope are the full equivalents of the chain and any of these may be utilized as the flexible pulling means to draw the tong-clamp and slab of meat forward to cut the skin from the latter.

Having described my invention, I claim,—

1. In a meat-skinning machine the combination with a cutter to cut between the skin and meat, of a clamp to engage the skin, a drum, a flexible device wound upon the drum and having a connection with the clamp to pull the latter, driving means having two coacting revolving members to cause the drum to revolve and automatic means for moving one of said revolving members with respect to the other to disengage them when a predetermined movement of the clamp has been made.

2. In a meat skinning machine the combination with a cutter to cut between the skin and meat, of a clamp to engage the skin, a drum, a flexible device wound upon the drum and having a connection with the clamp to pull the latter, driving means having two coacting revolving members to cause the drum to revolve and trip means in the path of the clamp and cut skin and means operated by the trip means for moving one of said revolving members from engagement with the other to stop the movement of the drum.

3. In a meat skinning machine the combination with a stationary cutter, of a clamp to engage the skin, a drum, flexible means having an end attached to the clamp and wound on the drum, a worm and gear drive for the drum, and means for separating the worm and gear drive to stop the motion of the drum.

4. In a meat skinning machine the combination with a stationary cutter, of a clamp to engage the skin, a drum, flexible means having an end attached to the clamp and wound on the drum, a worm and gear drive for the drum, trip means in the path of the clamp, and means actuated by the trip means for separating the worm and gear drive to stop the motion of the drum.

5. In a meat skinning machine the combination with a stationary cutter, of a clamp to engage the skin, a drum mounted on a shaft, flexible means having an end attached to the clamp and wound upon the drum, a gear on the drum-shaft, driving means to engage said gear and means for moving the drum-shaft and gear toward or from the said driving means to actuate or stop the movement of the drum.

6. In a meat skinning machine the combination with a stationary cutter, of a clamp to engage the skin, a drum mounted on a shaft, flexible means having an end attached to the clamp and wound upon the drum, a gear on the drum-shaft, driving means to engage said gear and automatic trip means for effecting a movement of the drum-shaft and gear away from the driving means to stop the motion of the drum.

7. In a meat skinning machine the combination with a stationary cutter, of a clamp to engage the skin of the meat, a drum-shaft carrying a drum, a flexible device wound on the drum and having connection with the clamp, a gear on the drum-shaft, a continuously-operating means for driving the gear, a manually operated means for moving the drum-shaft and gear in one direction to engage the gear with the continuously-operating means and a trip device to automatically release the gear from said continuously-operating means.

8. In a meat skinning machine the combination with a table having a guideway thereon, of a clamp-device including a pair of arms and a link said clamp-device being directed by said guideway, a stationary cutter for cutting the skin from the slab of meat, a drum-shaft carrying a drum, a flexible strand wound on the drum and having an end attached to the link of the clamp-device means for operating the drum-shaft and treadle means for controlling the drum-shaft operating means.

9. In a meat skinning machine the combination with a cutter, of a clamp to engage the skin, a drum-shaft and drum, a flexible device extending from the drum and attached to the clamp device, means for mounting the drum-shaft so at least one end of it may be moved laterally, a gear on the drum-shaft, driving means for operating the gear, a rock-arm, a bell-crank, means attached to the rock-arm for moving the bell-crank and to also move the drum-shaft and gear laterally to bring the gear and driving-means into engagement, and trip means attached to the bell-crank for releasing the drum-shaft to disengage the gear from the driving means.

10. In a meat skinning machine the combination with a table having a guideway, of a clamp device to engage the skin of the meat, power operated means for moving the clamp along the guideway and a trip device extending into the guideway and actuated as the clamp advances along the table to cut off the power means.

In testimony whereof I affix my signature.

CHARLES E. MERRICK.